United States Patent [19]

Harrell et al.

[11] 3,782,038
[45] Jan. 1, 1974

[54] APPARATUS FOR GRAINING PLATES
[75] Inventors: Robert E. Harrell, Manchester; Roy C. Bax; Leonard P. Kumpf, both of St. Louis; Donald R. Toliver, Bridgeton, all of Mo.
[73] Assignee: Western Litho Plate & Supply Co., St. Louis, Mo.
[22] Filed: May 5, 1971
[21] Appl. No.: 140,333

[52] U.S. Cl. .................................................. 51/6
[51] Int. Cl. ........................................... B24b 19/00
[58] Field of Search ..................... 51/6, 7, 17, 317, 51/235

[56] References Cited
UNITED STATES PATENTS

| | | | |
|---|---|---|---|
| 1,199,028 | 9/1916 | Cornwall | 51/6 |
| 1,900,090 | 3/1933 | Beckett | 51/6 |
| 1,925,963 | 9/1933 | Huck | 51/6 |
| 1,960,447 | 5/1934 | Metrick | 51/6 |
| 2,225,752 | 12/1940 | Mertes et al. | 51/6 |
| 2,413,898 | 1/1947 | Zarkin | 51/6 |
| 3,579,916 | 5/1971 | Boettcher | 51/235 |
| 2,074,633 | 3/1937 | Zarkin | 51/6 |
| 3,004,766 | 10/1961 | Bryant | 51/235 |
| 3,114,991 | 12/1963 | Flowers et al. | 51/235 |

FOREIGN PATENTS OR APPLICATIONS 926,472   3/1955   Germany ...................... 51/6

Primary Examiner—Charles W. Lanham
Assistant Examiner—E. M. Combs
Attorney—Koenig, Senniger, Powers & Leavitt

[57] ABSTRACT

Apparatus for graining aluminum lithographic plates comprising a vacuum table adapted to hold plates to be grained thereon by vacuum, and to be oscillated in level position with steel balls thereon in a slurry for graining the exposed faces of the plates. The table carries a ball hopper at one end thereof, and is tiltable from its level graining position to a ball-unloading position inclined downward toward this end for gravity discharge of balls from the table to the hopper, and also to a ball-loading position inclined downward away from this end for delivery of balls from the hopper to the table, with the hopper swingable between a ball-receiving position and a ball-delivery position relative to the table.

3 Claims, 17 Drawing Figures

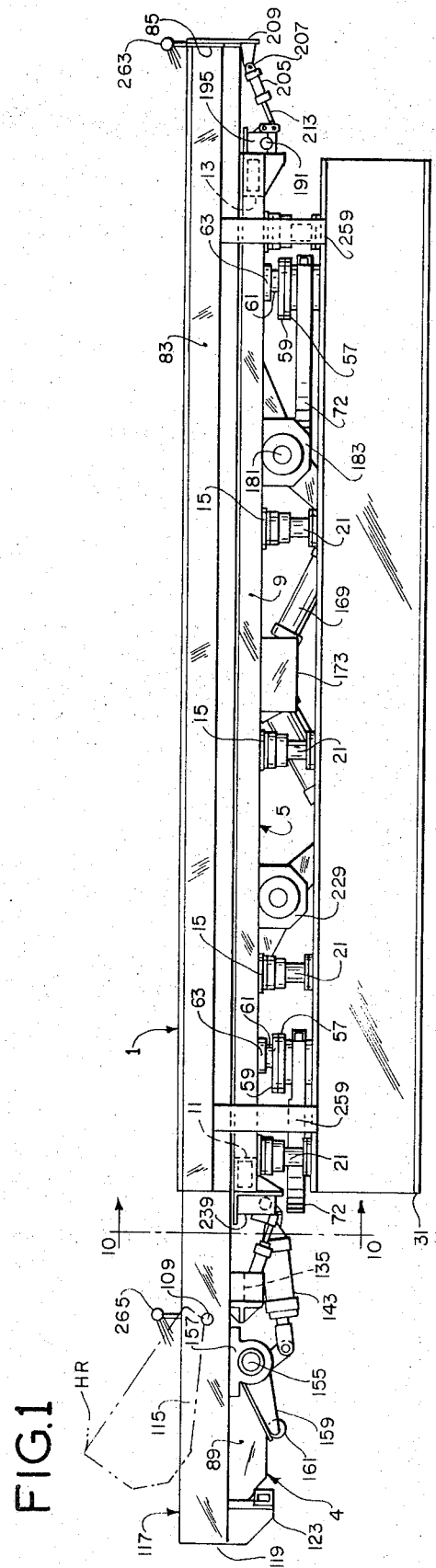
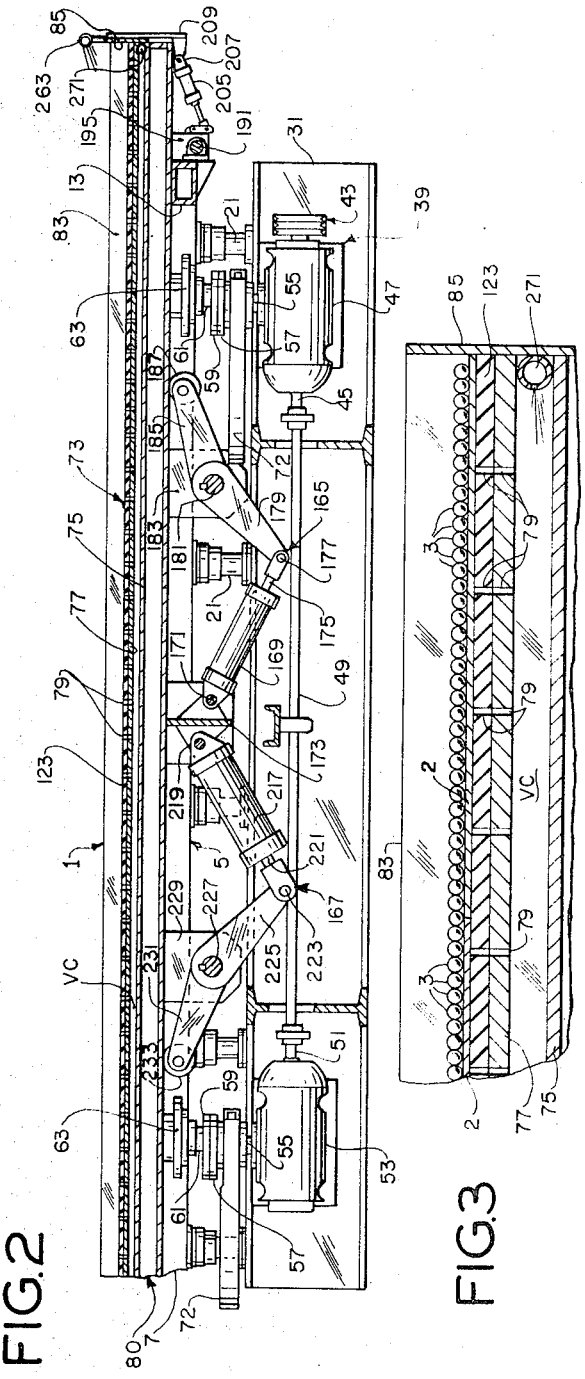

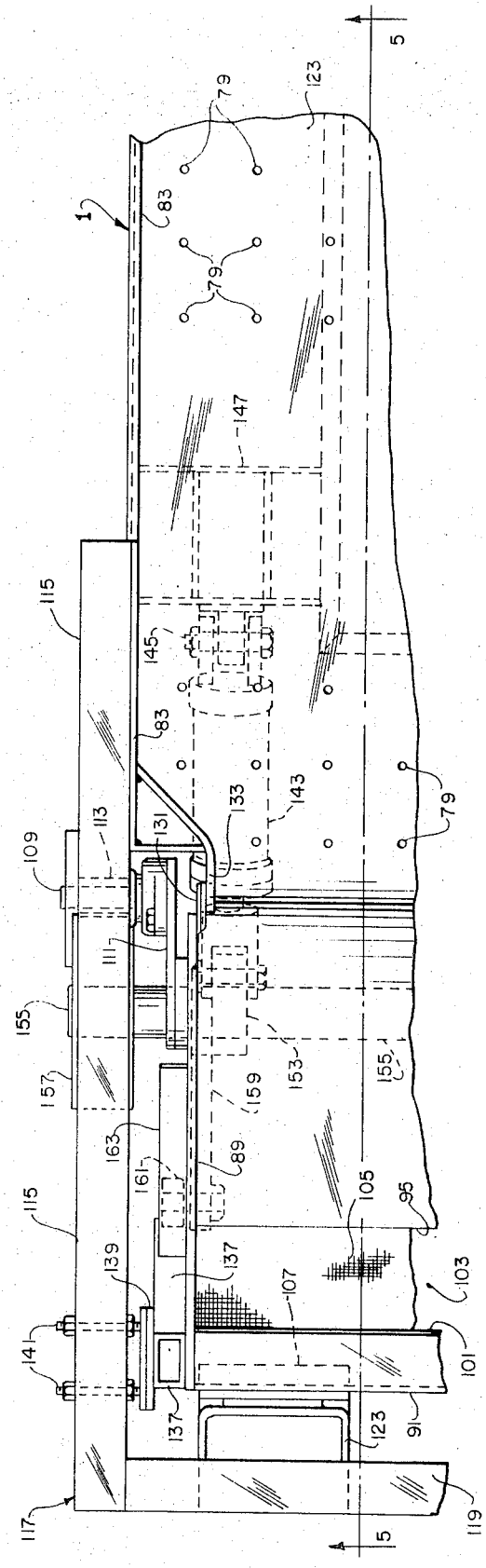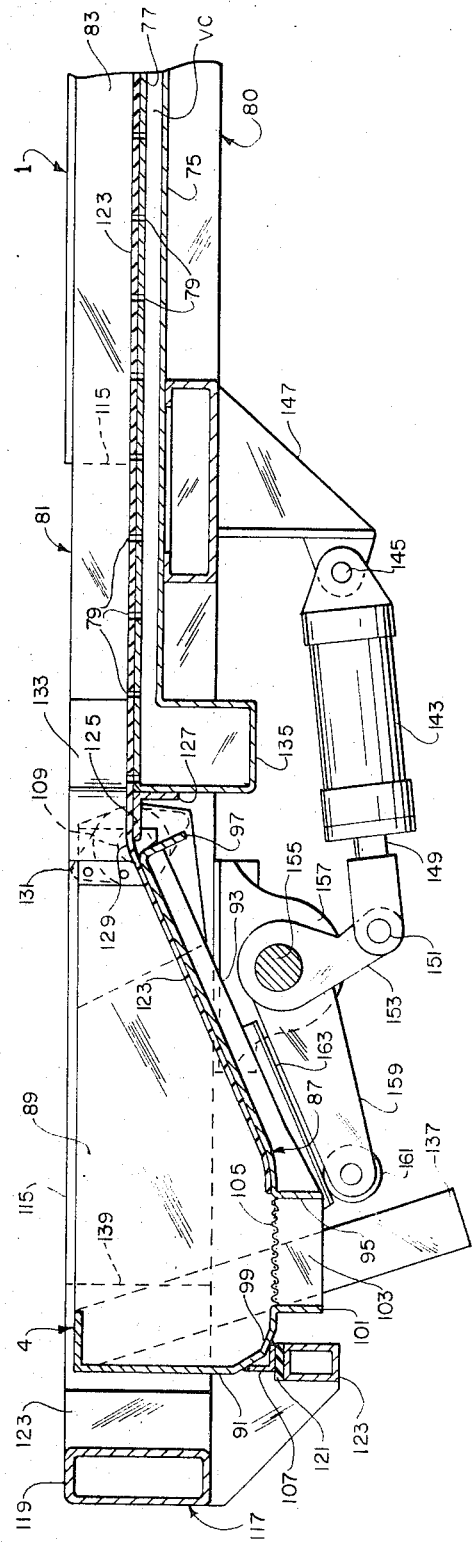

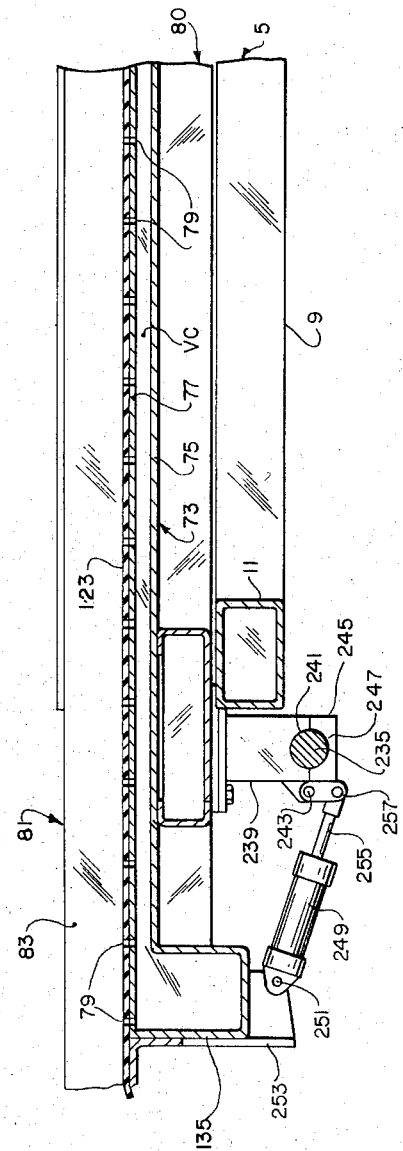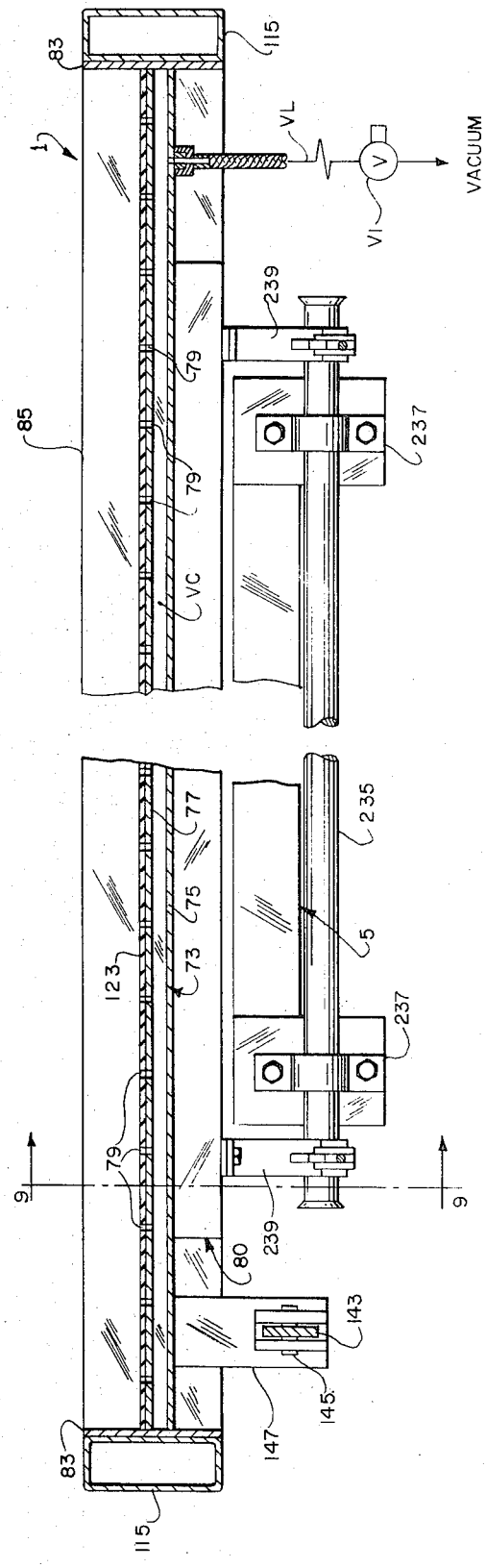
FIG.9
FIG.10

FIG. 11
FIG. 12
FIG. 13A
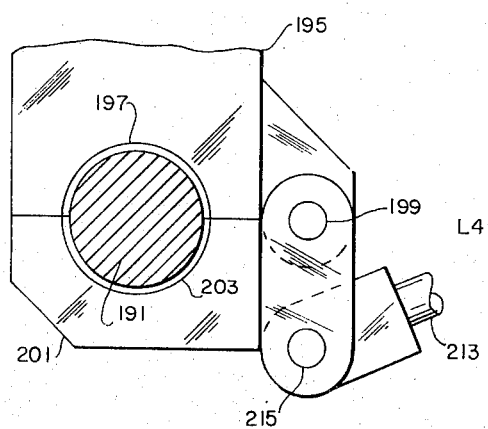
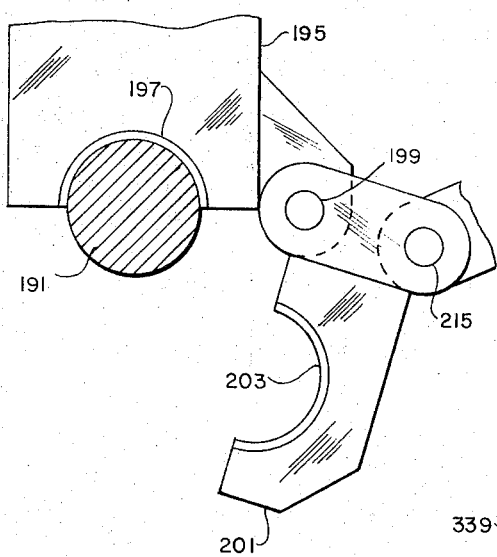
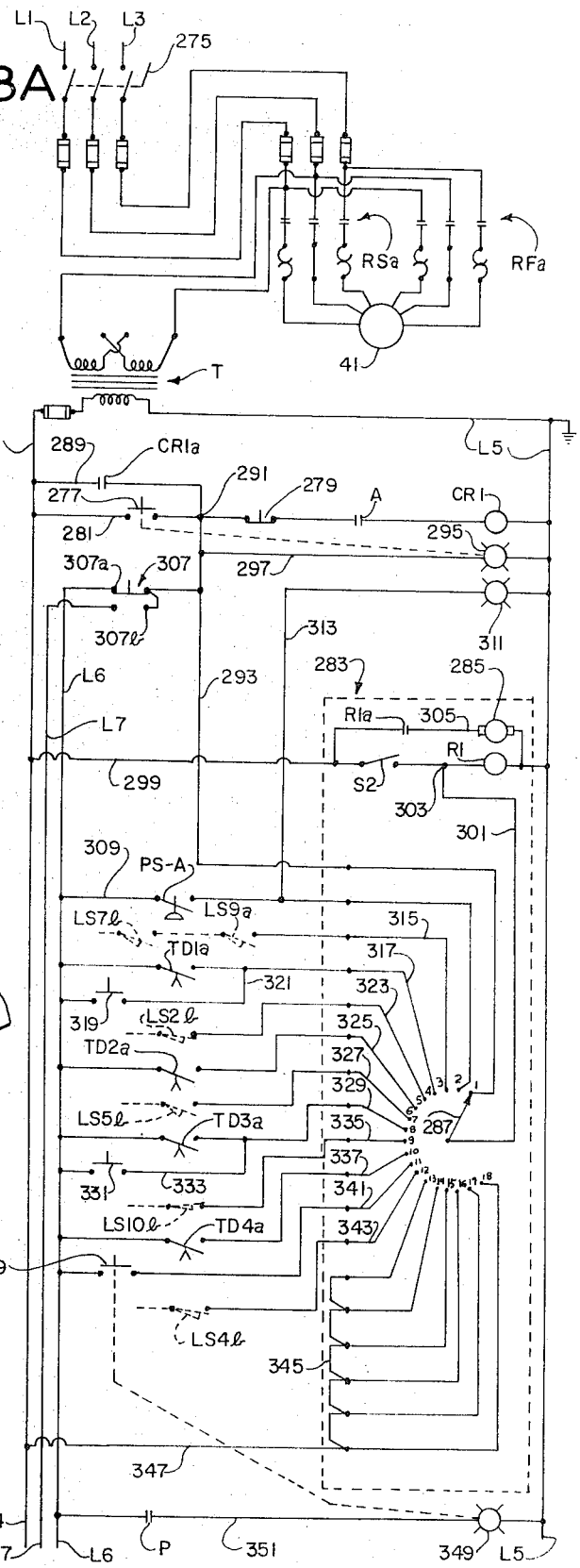

FIG.15

| # | OPERATION | CONTACTOR 287 STEPPED FORWARD BY OPERATION OF: | A | B | C | D | E | F | G | H | I | J | K | L | M | N | O | P | Q | R | S | T |
|---|---|---|---|---|---|---|---|---|---|---|---|---|---|---|---|---|---|---|---|---|---|---|
| 1 | "READY" | | X | O | O | O | O | O | O | O | O | O | O | O | O | O | O | O | | | | |
| 2 | V2 CLOSED. V1 OPEN— VACUUM ON. | RUN SWITCH 277 | X | X | O | O | O | O | O | O | O | O | O | O | O | O | O | O | | | | |
| 3 | TABLE RUN SLOW AND RAISED TO BL POSITION. HOPPER RAISED | PRESSURE SWITCH PS4 | X | X | X | O | O | O | O | O | O | O | O | O | O | O | O | O | | | | |
| 4 | BALLS SHAKEN OUT OF HOPPER | LS7b AND S9a | X | X | X | X | O | O | O | O | O | O | O | O | O | O | O | O | | | | |
| 5 | TABLE LOWERED AND LOCKED | TD1a | X | X | X | X | X | O | O | O | O | O | O | O | O | O | O | O | | | | |
| 6 | TABLE RUN FAST FOR GRAINING | LS2b | X | X | X | X | X | X | O | O | O | O | O | O | O | O | O | O | | | | |
| 7 | TABLE RUN SLOW AND RAISED TO BU POSITION. HOPPER LOWERED | TD2a | X | X | X | X | X | X | X | O | O | O | O | O | O | O | O | O | | | | |
| 8 | BALLS SHAKEN BACK INTO HOPPER. PLATE AND HOPPER SPRAYS ON | LS5b | X | X | X | X | X | X | X | X | O | O | O | O | O | O | O | O | | | | |
| 9 | V2 OPEN. V1 CLOSED. TABLE STOPS | TD3a (OR 331) | X | X | X | X | X | X | X | X | X | O | O | O | O | O | O | O | | | | |
| 10 | BED SPRAY ON. | LS10b | X | X | X | X | X | X | X | X | X | X | O | O | O | O | O | O | | | | |
| 11 | PAUSE FOR PLATE REMOVAL | TD4a | X | X | X | X | X | X | X | X | X | X | X | O | O | O | O | O | | | | |
| 12 | TABLE LOWERED AND LOCKED | 339 | X | X | X | X | X | X | X | X | X | X | X | X | O | O | O | O | | | | |
| 13 | HOMING | LS4b | X | X | X | X | X | X | X | X | X | X | X | X | X | O | O | O | | | | |
| 14 | " | | O | O | O | O | O | O | O | O | O | O | O | O | O | O | O | O | | | | |
| 15 | " | | O | O | O | O | O | O | O | O | O | O | O | O | O | O | O | O | | | | |
| 16 | " | | O | O | O | O | O | O | O | O | O | O | O | O | O | O | O | O | | | | |
| 17 | " | | O | O | O | O | O | O | O | O | O | O | O | O | O | O | O | O | | | | |
| 18 | " | | O | O | O | O | O | O | O | O | O | O | O | O | O | O | O | O | | | | |

LOAD SWITCHES OF STEPPING SWITCHES 283

APPARATUS FOR GRAINING PLATES

BACKGROUND OF THE INVENTION

This invention relates to apparatus for graining plates, and more particularly to apparatus for graining aluminum lithographic plates.

Plates of sheet aluminum coated on one face with a light-sensitive material are widely used as lithographic plates in lithographic printing operations. For best results, it is desirable that such plates be prepared for the application of the coating with a special finish or "grain" on the stated face. One type of apparatus which has been used for abrading the faces of aluminum plates to provide a suitable grain comprises an oscillatory table on which plates are clamped down and their upper surfaces abraded by means of steel balls and an abrasive slurry on the table (which has a rim for holding the slurry and the balls thereon). While this type of apparatus has been generally satisfactory so far as the end result (i.e., grained plates) is concerned, it takes considerable time to clamp the plates to the table, to load the table with the balls, unload the balls for removal of the plates, and to unclamp and remove the plates. Also, the capacity of a table for plates of different sizes and gage-thickness is limited.

SUMMARY OF THE INVENTION

Among the several objects of this invention may be noted the provision of improved plate graining apparatus of the general class above described in which loading, distribution and unloading of the balls are automatically and relatively rapidly and efficiently effected; the provision of such apparatus in which the balls are effectively automatically cleaned and undersized balls automatically removed (as is desirable noting that undersized balls would have a tendency to gather in various areas of the table and adversely affect the quality of the plates where they have gathered); the provision of such apparatus in which the placement and securement of plates on the table is expedited, and in which plates of various sizes and thickness may be readily placed and secured and removed, with maximum utilization of the area of the table.

In general, apparatus made in accordance with this invention comprises a table adapted to be oscillated in level position with balls in a slurry thereon for graining plates held on the table. A hopper for the balls is provided at one end of the table. The table is mounted for being tilted from its said level position to a ball-unloading position inclined downwardly toward its said hopper end for gravity discharge of balls from the table to the hopper, and also for being tilted to a ball-loading position inclined downwardly away from its said hopper end for gravity delivery of balls from the hopper to the table, means being provided for effecting tilting of the table either to its said ball-unloading position or its ball-loading position. Other objects and features will be in part apparent and in part pointed out hereinafter.

BRIEF DESCRIPTION OF THE DRAWINGS

FIG. 1 is a side elevation of apparatus made in accordance with this invention;

FIG. 2 is a vertical longitudinal section of the apparatus, with parts broken away and omitted at the left end of the view;

FIG. 3 is an enlarged fragment of FIG. 2;

FIG. 4 is a plan of part of the apparatus at its hopper end on a larger scale than FIGS. 1 and 2;

FIG. 5 is a vertical section on line 5—5 of FIG. 4;

FIG. 9 is a vertical longitudinal section on line 9—9 of FIG. 10;

FIG. 10 is a vertical transverse section on line 10—10 of FIG. 1;

FIGS. 11 and 12 are enlarged views showing certain lock members in closed (FIG. 11) and open (FIG. 12) position;

FIG. 15 is a chart showing the programming of a stepping switch of the apparatus.

Corresponding reference characters indicate corresponding parts throughout the several views of the drawings.

DESCRIPTION OF THE PREFERRED EMBODIMENT

Figure 6:
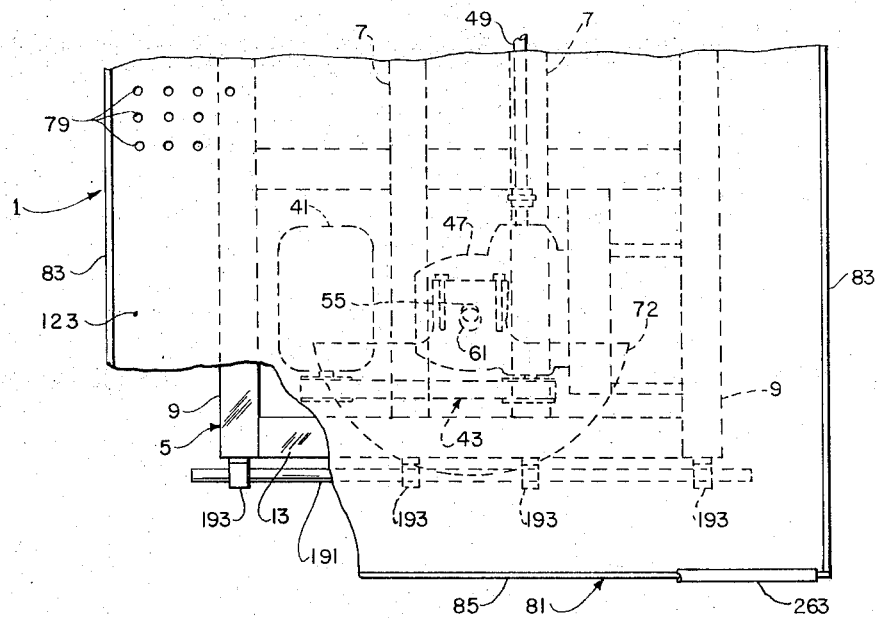
FIG. 6 is a plan of part of the apparatus at its opposite end on the same scale as FIGS. 1 and 2, the view being turned 90°.
Figure 7:
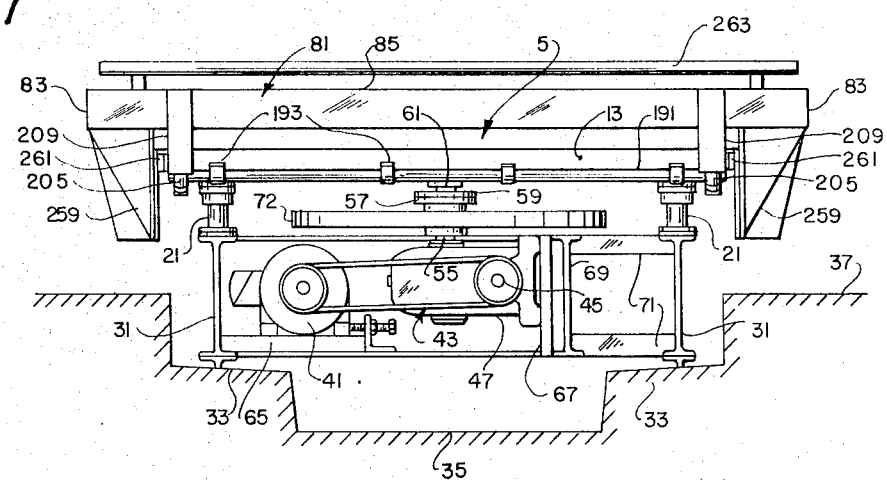
FIG. 7 is an end view of the apparatus as viewed from its right end in FIG. 1 (the lower end of FIG. 6)

Referring to the drawings, first more particularly to FIGS. 1–4, apparatus made in accordance with this invention for graining plates, and particularly sheet aluminum plates to be used as lithographic plates, is shown to comprise a vacuum table generally designated 1 adapted by means of vacuum to hold plates thereon to be grained, as will appear. The plates to be grained are indicated at 2 in FIG. 3. The table is adapted to be oscillated in level position (as shown in FIGS. 1 and 2 and as indicated at TL in FIG. 8) with steel balls 3 (which may be ⅜ inch in diameter or less) in an abrasive slurry thereon for graining the exposed upper faces of the plates 2 held on the table. The balls are omitted in FIGS. 2, 4 and 5. There are a large number of balls, generally sufficient, when the balls are spread out in a double layer, to cover the entire table. A hopper for the balls generally designated 4 is provided at one end of the table, which end may be referred to as its hopper or head end, and oscillates with the table. The table is mounted, as will appear, for being tilted from its level position to a ball-unloading position inclined downward toward its hopper end, as indicated at BU in FIG. 8, for gravity discharge of balls from the table to the hopper, and also for being tilted to a ball-loading position as indicated at BL in FIG. 8 inclined downwardly away from its said hopper end for gravity delivery of balls from the hopper to the table. The hopper is pivotally mounted on the table for being swung from the lowered level position relative to the table in which it is shown in solid lines in FIGS. 1 and 8 to the raised up-tilted position relative to the table illustrated in phantom at HR in FIGS. 1 and 8.

Figure 14:
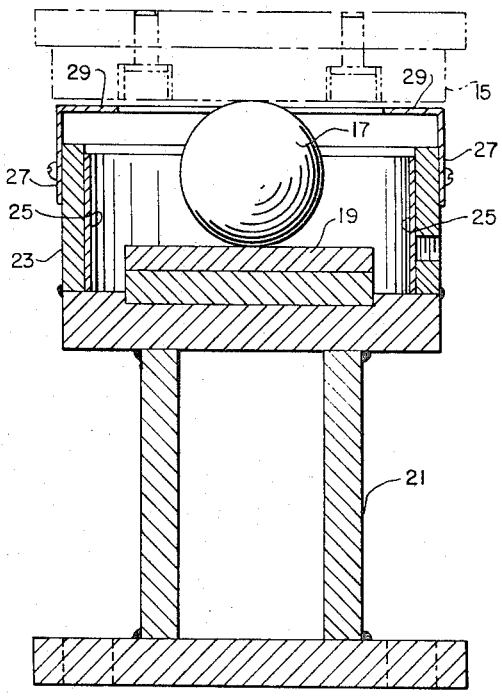
FIG. 14 is a vertical section of a ball stand of the apparatus.

The table 1 is of elongate rectangular shape in plan. It is mounted on an oscillable elongate rectangular horizontal carriage generally designated 5 which includes a pair of intermediate longitudinal bars 7 (see FIGS. 2 and 6) on opposite sides of its longitudinal center line, a pair of outside longitudinal bars 9 spaced outward from the intermediate longitudinal beams 7, and transversely extending end bars 11 and 13. Each of these bars is of hollow rectangular cross section. The side bars 9 of this carriage have hardened steel pads such as indicated at 15 on their bottoms spaced at intervals along the length of these bars bearing on hardened steel balls 17 each adapted to roll on a circular hardened steel bearing plate 19 mounted on the upper end of a stand 21 having an annular wall 23 surrounding the bearing plate 19, and extending upward thereabove forming an oversize socket for the ball 17 (see particularly FIG. 14). The wall 23 has a brass ring 25 as a liner, and a sheet metal ring 27 extending upward therefrom around its outside with an inwardly directed annular flange 29 at the upper end of the ring. The ball stands 21 are mounted on the upper flanges of a pair of I-beams 31 extending along ledges 33 on opposite sides of an elongate pit 35 in a concrete foundation 37. The carriage 5, bearing on the balls 17, is adapted to oscillate circularly in a horizontal plane via rolling of the balls 17 around on the plates 19 within the annular walls 23, and means such as indicated at 39 is provided for circularly orbiting the carriage in the stated horizontal plane. As shown in FIGS. 1, 2, 6 and 7, this means comprises an electric motor 41 driving via a belt and pulley drive 43 the input shaft 45 of a first speed reducer 47 at one end of the apparatus. A drive shaft 49 extends from input shaft 45 to the input shaft 51 of a similar speed reducer 53 at the other end of the apparatus. Each speed reducer has an output shaft 55 extending upward therefrom. Secured on a circular flange 57 at the upper end of each of shafts 55 is a circular flange 59 having an eccentrically located crank pin 61 extending upwardly therefrom with its upper end in a bearing 63 mounted on the bottom of the carriage 5 in position between the intermediate longitudinal bars 7 of the carriage 5. The arrangement is such that on operation of the motor 41, the crank pins 61 are rotated by shafts 55 in a circle about the vertical axes of the latter to effect circular orbiting of the carriage 5 with the circular orbit having a radius equal to the eccentricity of the pins 61 relative to the shafts 55. The motor 41 is mounted on a platform 65 (FIG. 7) adjacent one of the I-beams 31 on the inside thereof, and the speed reducers 47 and 53 are mounted on vertical plates 67 on the inside of an intermediate I-beam 69 secured to the other I-beam 31 as indicated at 71. Each of the shafts 55 is provided with a counterbalance 72.

The vacuum table 1 has a double bottom generally designated 73 comprising an imperforate bottom plate 75 and a perforate top plate 77. The perforations in the latter are indicated at 79. These perforations may be of 3/16 inch diameter, with 30 perforations per square foot of area of the plate. The space between the plates 73 and 75 constitutes a vacuum chamber VC in which a vacuum is adapted to be drawn via a vacuum line VL (diagrammatically represented in FIG. 10) having a solenoid-operated vacuum valve VL (see also FIG. 8) therein, this line being connected to a suitable evacuating means. Line VL includes a flexible portion connected to the table to accommodate the oscillation and tilting of the table.

The bottom plate 75 is mounted on a base frame generally designated 80. The table has a rim generally designated 81 extending upwardly along one side, its end opposite the hopper and its other side, and is open at its hopper end. This rim 81 is formed by vertical plates 83 extending up from the sides of the double bottom and a vertical plate 85 extending up from the opposite end of the bottom, and is provided to retain the aforesaid slurry and graining balls 3 on the table.

The hopper 4 (see particularly FIGS. 4 and 5) has a bottom generally designated 87, side walls each designated 89 and an end wall 91 at one end, being open at its other end. The side walls 89 are constituted by metal plates having bottom edges 93 (see FIG. 5) which slant up toward their top edges from a deep section of the side plates adjacent end wall 91. The bottom 87 comprises a metal plate welded at its side edges to the side plates 89 just above and generally parallel to said bottom edges 93. This bottom plate, which has downwardly directed end flanges 95 and 97 for reinforcement, terminates short of end wall 91, which is constituted by a plate extending between and welded at its sides to the side plates 89, this end plate being bent inward to form a step as indicated at 99 and having a downwardly extending lower margin 101 spaced from flange 95 of the bottom plate 87 to provide a drain opening 103 extending the full width of the hopper (from one side plate 89 to the other). A screen 105 is provided for this drain opening, of sufficiently small mesh as to be capable of retaining properly sized balls 3 thereon. Angle iron reinforcements such as indicated at 107 are welded to the end wall extending across the bottom of the step 99 adjacent the outer corners of the hopper.

The hopper 4 is provided with a pair of pivot pins 109 extending laterally outward from brackets 111 secured to opposite sides of the hopper at its open (shallow) end. These pins are journalled for swinging movement of the hopper about a horizontal transverse axis at the open end of the table 1 in bearings 113 provided in side bars 115 of a C-shaped frame 117 which projects from the open end of the table. The side bars 115 of this C-shaped frame, which are of hollow rectangular cross section, are welded on the outside of the vertical side plates 83 of the table and extend beyond the open end of the table, the outer ends of these side bars being spanned by an end bar 119 also of hollow rectangular cross section. The hopper is swingable within the C-shaped frame 117 on the horizontal axis of pins 109 relative to the table 1 between the lowered level position in which it is shown in solid lines in FIGS. 1, 5 and 8, and the raised uptilted position in which it is shown at HR in phantom lines in FIGS. 1 and 8. In the lowered level position of the hopper, which is determined by engagement of the angle irons 107 with pads 121 on hopper supports 123 carried by the end bar 119 of the C-shaped frame 117, the upper edges of the side and end walls 89 and 91 of the hopper are generally horizontal (when the table 1 is horizontal) and at a level slightly below the level of the top edges of the vertical side plates 83 of the table (and the top edges of the frame 117), and the bottom plate 87 of the hopper is inclined downwardly away from the open end of the table 1 (which may also be referred to as its head end).

The perforate top plate 77 of the table 1 has a perforate flexible cover or blanket 123, made of a suitable rubber, for example. This blanket has perforations indicated at 79 registering with perforations 79 in the table top plate 77 and extends forward over the horizontal leg 125 of an angle iron 127 extending transversely across the table 1 at its open end and thence down over the inclined bottom plate 87 of the hopper so as to close the gap at 129 between the end edges of plate 87 and the edge of leg 125 of the angle iron 127 (which latter edge is rounded as shown in FIG. 5), so that the bottom of the hopper is in effect continuous with while swingable with respect to the table top plate 77. The hopper has a pair of side seal plates 131 (made of urethane, for example) at its end toward the open end of the table secured to the inside of the hopper side walls 89 and projecting endwise therefrom and which have their inside faces in slidable sealing engagement with the outside faces of back-up plates 133 extending from the table 1, so that the sides of the hopper are in effect continuous with while swingable with respect to the vertical side walls 83 of the table. A trough or sump 135 is provided extending across the table 1 and underneath the table at its open end to collect slurry which may leak through perforations 79. Drainage from this sump is via a drain having a valve V2. This is a conventional motor-operated valve, the motor of which is operated in one direction to close the valve (in order to hold vacuum in chamber VC) and in the opposite direction to open it (to drain off slurry from VC and vent it). Stabilizer bars 137 are provided on the outside of the hopper side walls 89 adjacent the outer end of the hopper, these bars being slidable on the inside faces of stabilizer plates 139 adjustably mounted as indicated at 141 on the inside of side bars 115 of the C-shaped frame 117.

Means for raising and lowering the hopper 4 relative to the table is shown to comprise a hydraulic cylinder 143 pivotally mounted as indicated at 145 at one end on a bracket structure 147 which is secured to the bottom of the table 1 adjacent one side thereof. A piston rod 149 extends from a piston in the cylinder through the other end of the cylinder and is pin-connected at 151 to the end of a rocker arm 153 on a horizontal rock shaft 155 which extends transversely across the apparatus having its ends journalled in bearings 157 mounted on the bottoms of the side bars 115 of the C-shaped frame 117. The rock shaft 155 has a pair of radial lift arms 159 carrying rollers 161 at their free ends engaging bottom rails 163 on the sides 89 of the hopper. The arrangement is such that on retraction of the piston rod 149, the hopper is lowered relative to the table 1 (as shown in solid lines in FIGS. 1, 5 and 8), and on extension of the piston rod, lift arms 159 are swung upward to raise the hopper to its uptilted position HR relative to the table as shown in phantom in FIGS. 1 and 8 wherein its bottom plate 87 is slightly inclined downward toward the head end of the table. Operation of cylinder 143 is under control of a solenoid valve V3 having an "extend" solenoid V3a and a "retract" solenoid V3b.

Means indicated generally at 165 is provided for tilting the table 1 on carriage 5 to its ball-unloading position BU inclined downwardly toward its hopper or head end (its left end as viewed in FIGS. 1, 5 and 8), and means indicated generally at 167 is provided for oppositely tilting the table to its ball-loading position BL inclined downwardly away from its hopper end. As shown best in FIGS. 2 and 8, the means 165 for tilting the table to its ball-unloading position BU comprises a hydraulic cylinder 169 pivoted as indicated at 171 at one end on a bracket 173 secured to the carriage 5 adjacent its center. A piston rod 175 extends from a piston in cylinder 169 through the other end of the cylinder and is pin-connected at 177 to a rocker arm 179 on a horizontal rock shaft 181 extending transversely of the carriage therebelow and journalled at its ends in bearings 183 at the sides of the carriage 5. A pair of lift arms 185 extending radially from the rock shaft 181 have rollers 187 at their free ends engaging the bottom of the table bottom frame 80. Operation of cylinder 169 is under control of a solenoid valve V4 having an "extend" solenoid V4a and a "retract" solenoid V4b (see FIG. 8).

Figure 8:
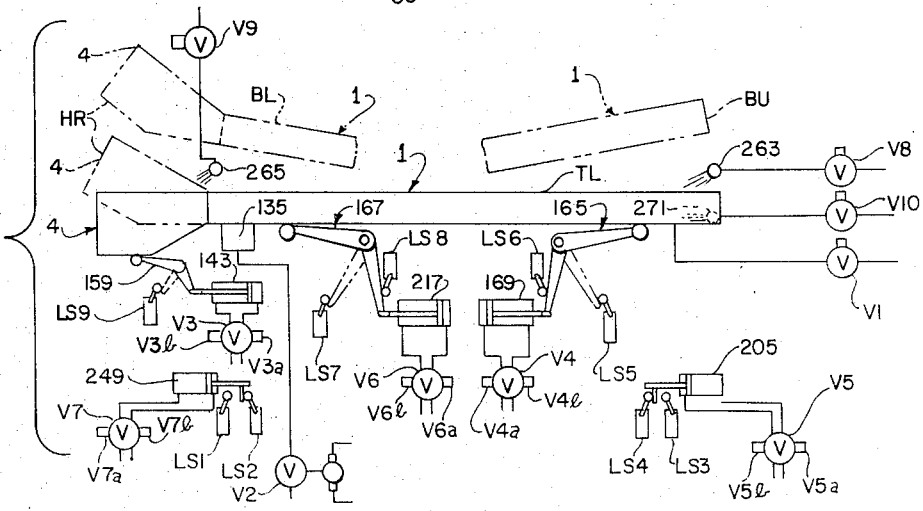
FIG. 8 is a diagrammatic view showing the various positions of the table and hopper of the apparatus, and showing the operating cylinders and valves of the apparatus.

The means 167 (see particularly FIGS. 2 and 8) for tilting the table to its ball-loading position BL inclined downwardly away from its hopper end is similar to means 165, comprising a hydraulic cylinder 217 pivoted as indicated at 219 at one end on bracket 173 oppositely to cylinder 169, with piston rod 221 extending from a piston in the cylinder 217 through the other end of the cylinder pin-connected at 223 to a rocker arm 225 on a horizontal rock shaft 227 extending transversely of the carriage 5 therebelow and journalled at its ends in bearings 229 at the sides of the carriage 5. A pair of lift arms 231 extending radially from the rock shaft 227 have rollers 233 at their free ends engaging the bottom of the table bottom frame 80. Operation of cylinder 217 is under control of a solenoid valve V6 having an "extend" solenoid V6a and a "retract" solenoid V6b (FIG. 8).

For tilting the table 1 to its ball-loading position BL, the table is pivoted for swinging movement on a horizontal axis adjacent its end away from the hopper (which may be referred to as its foot end). For this purpose, a table foot pivot rod 191 is provided extending horizontally transversely of the carriage 5 under the foot end of table 1, spaced slightly outward from the foot end of the carriage. Rod 191 is mounted in brackets 193 secured to the foot end of the carriage. The table has a pair of legs 195 extending downwardly from its bottom at opposite sides thereof adjacent its foot end having semicircular recesses 197 at their lower ends receiving the rod adjacent the ends of the rod. Pivoted at 199 on each leg 195 is a gripper or lock 201 having a semicircular recess 203 adapted to receive the rod below the lower end of the leg. Each gripper or lock 201 is adapted to be swung by a hydraulic cylinder 205 between the closed locking position in which it is illustrated in FIG. 11 cooperable with the lower end of the leg 195 for locking the table to the carriage and for pivoting the table for swinging movement about the axis of the rod (with the table locked to the rod), and the retracted open position shown in FIG. 12 wherein it is wholly clear of the rod. Each cylinder 205 is pivoted at one end as indicated at 207 on a bracket 209 mounted at the foot end of the table. The piston rod 213 of each cylinder extends out of the other end of the cylinder to a pin connection at 215 with the respective gripper 201. Operation of cylinders 205 is under control of a solenoid valve V5 having an "extend" solenoid V5a and a "retract" solenoid V5b (FIG. 8). For tilting the table 1 to its ball-unloading position BU, the table is pivoted for swinging movement on a horizontal axis adjacent its hopper or head end, and for this purpose a head pivot rod 235 is provided extending horizontally and transversely of the carriage 5 under the hopper end of table 1, spaced slightly outward from the head end of the carriage. Rod 235 is mounted in brackets 237 secured to the head end of the carriage. The table has a pair of legs 239 (like legs 195) extending downwardly from its bottom at opposite sides thereof adjacent its head end having semicircular recesses 241 at their lower ends receiving the rod 235 adjacent the ends of the rod. Pivoted at 243 on each leg 239 is a gripper or lock 245 (like grippers 201) having a semicircular recess 247 adapted to receive the rod 235 below the lower end of the leg. Each gripper or lock 245 is adapted to be swung by a hydraulic cylinder 249 between a closed locking position (corresponding to the closed position of grippers 201) cooperable with the lower end of the leg 239 for locking the table to the carriage and for pivoting the table for swinging movement about the axis of the rod 235 with the table locked to the rod, and a retracted open position (corresponding to the retracted position of grippers 201) wherein it is wholly clear of the rod. Each cylinder 249 is pivoted at one end as indicated at 251 on a bracket 253 extending down from the bottom of the table at its head end. The piston rod 255 of each cylinder 249 extends out of the other end of the cylinder to a pin connection at 257 with the respective gripper or lock 245. Operation of cylinders 249 is under control of a solenoid valve V7 having an "extend" solenoid V7a and a "retract" solenoid V7b.

The above described arrangement is such that with the grippers or locks 201 unlocked and grippers or locks 245 locked on 235, the table 1 may be tilted to its ball-unloading position BU by actuation of cylinder 169 to extend the piston rod 175, thereby to rock the shaft 181 and arms 185 counterclockwise as viewed in FIG. 2 to tilt the table upwardly about the axis of rod 235. With the grippers or locks 245 unlocked and grippers or locks 201 locked on rod 191, the table may be tilted to its ball-loading position BL by actuation of cylinder 217 to extend piston rod 221, thereby to rock shaft 227 and arms 231 clockwise as viewed in FIG. 2 to tilt the table upwardly about the axis of rod 191.

The table 1 has stabilizers 259 extending downwardly at the sides thereof on the outside of and slidably engageable with bronze pads 261 mounted at the sides of the carriage 5. These stabilize the table when it is tilted to its ball-unloading position BU and also when it is tilted to its ball-loading position BL, as well as when the table is down in its level position. Both sets of grippers 201 and 245 are adapted to be locked to their respective rods when the table is down in its level position for locking the table to the carriage.

A spray pipe 263 is mounted in suitable manner extending transversely across and above the table 1 adjacent its foot end, and another such pipe 265 extends transversely across and above the table adjacent its head end. These pipes are secured to the table in any suitable manner so as to move therewith when the table is tilted. Pipe 263 is adapted to spray water downwardly on the table, and pipe 265 is adapted to spray water downwardly into the hopper. Flexible water hose lines (not shown) are connected to these pipes with the delivery of water thereto under control of solenoid valves V8 and V9, respectively (see FIG. 8). A spray pipe 271 is provided within the table between plates 75 and 77 at its foot end for spraying water out over the bottom or bed plate 75. This also is supplied via a flexible hose line (not shown) under control of a solenoid valve V10.

The sequence of operation of the apparatus is under control of a system of limit switches illustrated in FIG. 8. A first limit switch LS1 is positioned for actuation by the piston rod 255 of one of the cylinders 249 when retracted to open grippers 245, and for deactuation when this piston rod is extended to close the grippers 245. A second limit switch LS2 is positioned for actuation by the stated piston rod 255 when extended to close the grippers 245, and for deactuation when this piston rod is retracted. A third limit switch LS3 is positioned for actuation by the piston rod 213 of one of cylinders 205 when retracted to open grippers 201, and for deactuation when this rod is extended to close the grippers 201. A fourth limit switch LS4 is positioned for actuation by the piston rod 213 when extended to close grippers 201, and for deactuation when this rod is retracted. A fifth limit switch LS5 is positioned for actuation by arm 179 when the table 1 is tilted to its ball-unloading position BU, and a sixth limit switch LS6 is positioned for actuation by arm 179 when the table is brought back down to its level position TL. A seventh limit switch LS7 is positioned for actuation by arm 225 when the table is tilted to its ball-loading position BL, and an eighth limit switch LS8 is positioned for actuation by the arm 225 when the table is brought back down to its level position TL. A ninth limit switch LS9 is positioned for actuation by arm 153 when the hopper 4 is raised. The contacts of these limit switches (and the contacts of other switches and certain relays of the apparatus) are shown in (FIGS. 13A-C in the positions occupied when the apparatus is at rest between cycles of operation, and subsequent references to contacts as being "normally open" or "normally closed" refers to their status when the apparatus is at rest between cycles.

Figure 13B:
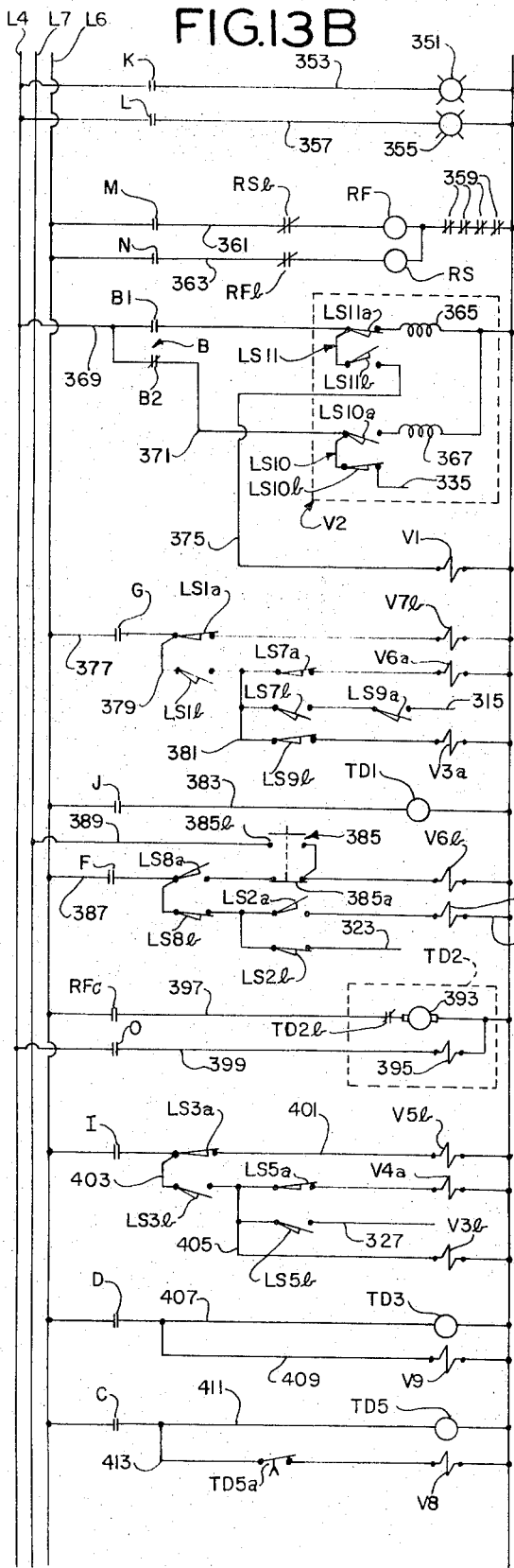
FIGS. 13A, B and C together constitute a wiring diagram.
Figure 13C:
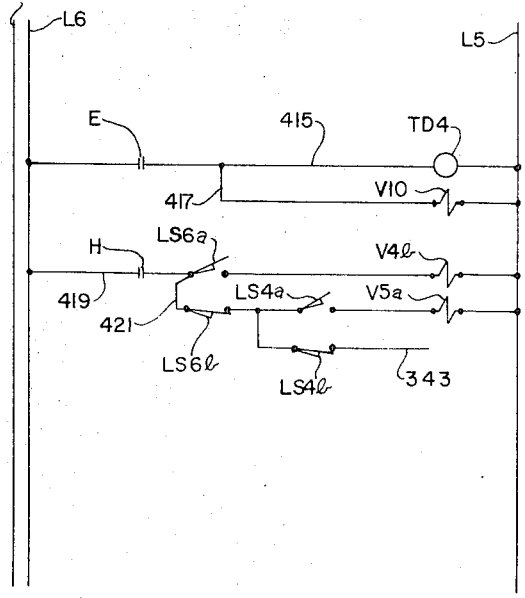

Now referring to FIGS. 13A-C, first more particularly to FIG. 13A, the apparatus is shown as being supplied with electrical power via a three-phase supply including lines L1, L2 and L3. A main switch for this supply is indicated at 275. The motor 41 for oscillating the carriage 5 and the table 1 has a winding (not specifically shown) for slow-speed operation thereof fed off lines L1, L2 and L3 under control of a set of contacts RSa (FIG. 13A) of a slow-speed motor relay RS (FIG. 13B) and a winding (not specifically shown) for high-speed operation thereof fed off lines L1, L2 and L3 under control of a set of contacts RFa (FIG. 13A) of a high-speed motor relay RF (FIG. 13B). Lines L1 and L2 feed the primary of a step-down transformer T, the secondary of which feeds power lines L4 and L5.

A normally open "Run" switch 277, a normally closed "Stop" switch 279, a normally open switch A and the coil of a control relay CR1 are connected in series across lines L4 and L5 in a line 281. Switch A is a load switch of a stepping switch 283, such as one sold under the trademark AGASTAT by the Agastat Division of Elastic Stop Nut Corporation of America, of Elizabeth, New Jersey. Generally, this stepping switch is one having a rotary programming drum and a motor 285 for indexing the drum in steps, with pins on the drum for actuating a plurality of so-called load switches A-P in a programmed sequence (determined by the disposition of the pins in the drum). The drum also carries a movable contactor indicated at 287 in FIG. 13A sequentially engageable with eighteen fixed contacts on stepping of the drum by the motor. The contactor 287, which steps counterclockwise as shown in FIG. 13A, is shown in its home position on the first of these contacts in FIG. 13A.

At CR1a is indicated a set of normally open contacts which are closed on energization of coil CR1. This set of contacts is connected in parallel with the "Run" switch 277 via a line 289 connected to a junction 291 in line 281 between the "Run" switch 277 and the "Stop" switch 279. A line 293 interconnects this junction 291 and the first contact of the stepping switch 283. A "Run" lamp 295 is connected in parallel with the "Stop" switch 279, load switch A and relay CR1 via a line 297. The stepping switch 283 includes a relay R1 adapted when energized to close a set of normally open contacts R1a, and further includes a limit switch S2 for maintaining the stepping switch motor 285 energized for an indexing interval (e.g., 20° of rotation of 287). The coil of relay R1 and limit switch S2 are connected in series across lines L4 and L5 in a line 299. The movable contactor 287 of the stepping switch 283 is connected via a line 301 to a junction 303 in line 299 between the limit switch S2 and relay R1. Contacts R1a and motor 285 are connected in series in a line 305 shunted around limit switch S2 and the coil of relay R1.

A line L6 including one set of contacts 307a of a double-throw selector switch 307 extends from line 293. A line L7 including the other set of contacts 307b of switch 307 parallels line L6. The switch 307 is adapted for closure of its contacts 307a to energize L6 for automatic operation of the apparatus and, alternately, for closure of its contacts 307b to energize L7 for manual operation of the apparatus. A line 309 including a pressure switch PS-A is connected between line L6 and the second contact of the stepping switch 283. This pressure switch is interconnected with the vacuum chamber VC of the table 1 and is adapted to close when a predetermined vacuum has been drawn in chamber VC. A lamp 311 for signalling that the vacuum has been drawn in chamber VC is connected in series with the pressure switch in a line 313 between line 309 and line L5. Contacts LS7b and LS9a of the aforesaid limit switches LS7 and LS9 are connected in series with one another to the third contact of stepping switch 283 in a line 315 (see FIGS. 13A and B). At TD1 (FIG. 13B) is indicated a time delay relay having a set of normally open contacts TD1a (FIG. 13A) connected in a line 317 between line L6 and the fourth contact of stepping swtich 283. A manual "Start Graining" switch 319 is connected in a line 321 in parallel with contacts TD1a. Normally closed contacts LS2b of limit switch LS2 are connected to the fifth contact of stepping switch 283 in a line 323. At TD2 (FIG. 13B) is indicated a motor-driven timer having a set of normally open contacts TD2a (FIG. 13A) connected in a line 325 between line L6 and the sixth contact of stepping switch 283. Normally open contacts LS5b of limit switch LS5 are connected to the seventh contact of stepping switch 283 in a line 327. At TD3 (FIG. 13B) is indicated a time delay relay having a set of normally open contacts TD3a (FIG. 13A) connected in a line 329 between line L6 and the eighth contact of stepping switch 283. A so-called "Shake-off Complete" switch 331 is connected in a line 333 in parallel with contacts TD3a. Contacts LS10b of a limit switch LS10 are connected to the ninth contact of stepping switch 283 in a line 335. At TD4 (FIG. 13C) is indicated a time delay relay having a set of contacts TD4a connected in a line 337 between line L6 and the tenth contact of stepping switch 283. A "Lower Table" switch 339 is connected in a line 341 between line L6 and the eleventh contact of stepping switch 283. Contacts LS4b of limit switch LS4 are connected to the twelfth contact of stepping switch 283 in a line 343. The thirteenth to the eighteenth contacts of stepping switch 283 are interconnected together as indicated at 345, and are interconnected with line L4 by a line 347.

A load switch P (FIG. 13A) of stepping switch 283 is connected in series with a "Lower Table" lamp 349 between lines L6 and L5 via a line 351. Load switch K (FIG. 13B) of stepping switch 283 is connected in series with a "Ready" lamp 351 between lines L4 and L5 via a line 353. Load switch L of stepping switch 283 is connected in series with a "Complete" lamp 355 between lines L4 and L5 via a line 357. Load switch M of stepping switch 283 is connected in series with normally closed contacts RSb of relay RS, the coil of relay RF and a set of overload switches 359 between lines L6 and L5 via a line 361. Load switch N of stepping switch 283 is connected in series with normally closed contacts RFb of relay RF and the coil of relay RS in a line 363 in parallel with M, RSb and RF.

The motor of the motor-operated sump valve V2 has a winding 365 for operating the motor in the direction to close the valve and a winding 367 for operating the motor in the opposite direction to open the valve. The valve includes a limit switch LS10 actuated to stop the motor when the valve opens and a limit switch LS11 actuated to stop the motor when the valve closes. The latter has normally closed contacts LS11a and normally open contacts LS11b. Normally open contacts B1 of a load switch B of the stepping switch 283, contacts LS11a and winding 365 are connected in series across lines L4 and L5 in a line 369. Normally closed contacts B2 of load switch B are series-connected with normally open contacts LS10a of limit switch LS10 and motor winding 367 in a line 371 in parallel with B1, LS11a and 365. Contacts B1 and LS11b are connected in series across lines L4 and L5 with the solenoid of the vacuum valve V1 via a line 375. Contacts B2 and LS10b are series-connected between line L4 and the ninth contact of stepping switch 283 via the aforesaid line 335 (FIG. 13A).

A load switch G of the stepping switch 283 is series-connected with normally closed contacts LS1a of limit switch LS1 and the "retract" solenoid V7b of valve V7 for cylinders 249 in a line 377 across lines L6 and L5. Normally open contacts LS1b of limit switch LS1 are series-connected with normally closed contacts LS7a and the "extend" solenoid V6a of valve V6 for cylinder 217 in a line 379 in parallel with LS1a and V7b. Normally open contacts LS7b of LS7 and normally open contacts LS9a of limit switch LS9 are series-connected with G and LS1b between line L6 and the third contact of stepping switch 283 via the aforesaid line 315. Normally closed contacts LS9b of limit switch LS9 are series-connected with the "extend" solenoid V3a of valve V3 for cylinder 143 and with G and LS1b across lines L6 and L5 via a line 381.

Load switch J of stepping switch 283 is series-connected with the coil of time delay relay TD1 across lines L6 and L5 in a line 383. Load switch F of switch 283 is series-connected with normally open contacts LS8a of limit switch LS8, normally closed contacts 385a of a manually operable "Reset Plates" switch 385 and the "retract" solenoid V6b of valve V6 for cylinder 217 in a line 387 across lines L6 and L5. Normally open contacts 385b of manual switch 385 are connected in a line 389 interconnecting line L7 to line 387 between 385a and V6b. Normally closed contacts LS8b of limit switch LS8, normally open contacts LS2a of limit switch LS2 and the "extend" solenoid V7a of valve V7 for cylinders 249 are series-connected in a line 391 in parallel with LS8a, 385a and V6b. Normally closed contacts LS2b of LS2 are series-connected with F and LS8b between line L6 and the fifth contact of stepping switch 283 via the aforesaid line 323.

The motor of the motor-driven timer TD2 is indicated at 393, an electric clutch of this timer is indicated at 395, and a normally closed set of contacts of this timer is indicated at TD2b. These contacts open, and the previously mentioned contacts TD2a (FIG. 13A) close, when the timer TD2 has timed out a predetermined time interval. Normally open contacts RFc of relay RF are series-connected with contacts TD2b and motor 393 in a line 397 across lines L6 and L5. Load switch 0 of stepping switch 283 is series-connected with clutch 395 in a line 399 across lines L4 and L5.

Load switch I of stepping switch 283 is series-connected with normally closed contacts LS3a of limit switch LS3 and the "retract" solenoid V5b of valve V5 for cylinders 205 via a line 401. Normally open contacts LS3b of limit switch LS3 are series-connected with normally closed contacts LS5a of limit switch LS5 and the "extend" solenoid V4a of valve V4 for cylinder 169 in a line 403 in parallel with LS3a and V5b. Normally open contacts LS5b of limit switch LS5 are series-connected with I and LS3b between line L6 and the seventh contact of stepping switch 283 via the aforesaid line 327. The "retract" solenoid V3b of valve V3 for cylinder 143 is connected in a line 405 in parallel with LS5a and V4a.

The coil of time delay relay TD3 is series-connected with load switch D of stepping switch 283 across lines L6 and L5 via a line 407. The solenoid of the hopper spray valve V9 is connected in parallel with the TD3 coil via a line 409. The load switch C of stepping switch 283 is series-connected with the coil of a time delay relay TD5 across lines L6 and L5 via a line 411. Normally closed contacts TD5a of relay TD5 are series-connected with the plate spray solenoid valve V8 in a line 413 in parallel with TD5.

Load switch E (FIG. 13C) of stepping switch 283 is series-connected with the coil of time delay relay TD4 across lines L6 and L5 via a line 415. The bed spray solenoid valve V10 is connected in parallel with TD4 via a line 417. Load switch H of stepping switch 283 is series-connected with normally open contacts LS6a of limit switch LS6 and the "retract" solenoid V4b of valve V4 for cylinder 169 across lines L6 and L5 via a line 419. Normally closed contacts LS6b of limit switch LS6 are series-connected with normally open contacts LS4a of limit switch LS4 and the "extend" solenoid V5a of valve V5 for cylinders 205 in a line 421 in parallel with LS6a and V4b. Normally closed contacts LS4b of limit switch LS4 are series-connected with switch H and contacts LS6b between line L6 and the twelfth contact of stepping switch 283 via the aforesaid line 343.

FIG. 15 is a chart showing the programming of the stepping switch 283, in accordance with the stepping of the movable contactor 287 of this switch from contact to contact. The numbers in the first column of the chart refer to the eighteen contacts or positions of the stepping switch. The references in the third column of the chart are to the elements the operation of each of which effects the stepping of the movable contactor 287 from contact to contact. For example, operation of the "Run" switch 277 effects stepping of movable contactor 287 from the first to the second contact of the stepping switch 283 (as will appear). The fourth column shows the state of the load switches A–P of stepping switch 283 for each step of the latter, "X" indicating actuation of each respective load switch, and "O" indicating deactuation of the load switch. For example, with movable contactor 287 on the first contact of the stepping switch 283 (step 1 on the chart), load switches A and K are actuated and the remainder are deactuated; with 287 on the second contact of 283 (step 2 on the chart), load switches A and B are actuated and the remainder of the load switches are deactuated. The commercial stepping switch 283 which has been used is an eighteen-contact switch with twenty load switches A-T. Load switches Q-T of the stepping switch 283 are not used, and the thirteenth to the eighteenth contacts are interconnected as indicated at 345 in FIG. 13A for homing of the movable contactor 287 (i.e., for movement of 287 back to the first contact) when it steps off the twelfth contact. Operation is as follows:

For automatic operation of the apparatus, the selector switch 307 is set to close contacts 307a, whereby, with the main power switch 275 closed, line 6 is energized as well as line 4. At the start of any cycle of operation, the table 1 is down in its level position indicated at TL in FIG. 8. Grippers 201 and 245 are in their closed locking position. The hopper 4 is down in its lowered level position. Balls 3 are in the hopper. Operation then proceeds in steps as follows (refer also to FIG. 15):

STEP 1

Rectangular aluminum plates 2 to be grained are placed on the blanket 123 of the table 1. Substantially the entire area of the blanket may be covered with plates, with adjacent edges of adjacent plates in contiguous relation. The plates may be of various sizes. Plates of various gages may be processed. The timer TD2 is set for the graining time desired and the "Run" switch 277 is actuated to start a cycle.

STEP 2

On actuation of the "Run" switch 277, relay CR1 is energized to close its contacts CR1a, thereby closing line 289 to provide a holding circuit around switch 277. Relay CR1 is energized via load switch A of stepping switch 283, this switch A being closed throughout the excursion of the movable contactor 287 of the stepping switch over the first 13 contacts of the latter (see FIG. 15). Lamp 295 is illuminated to signal that the apparatus is running. Also on actuation of the "Run" switch 277, a circuit is closed for relay R1 via line 293, the first contact and the movable contactor 287 of stepping switch 283, and lines 301 and 299. Relay contacts R1a close and this energizes the stepping switch motor 285 to step 287 to the second contact of 283 and actuate load switch B, closing contacts B1 in line 369 and opening contacts B2 in line 371. With contacts B1 and LS11a closed in line 369, coil 365 of the motor for operating valve V2 is energized to close valve V2. When it closes, contacts LS11a open, stopping the motor and contacts LS11b close to energize and open the vacuum valve V1 via line 375. Limit switch LS10 is deactuated so that its contacts LS10a (line 371) close and its contacts LS10b (line 335) open. With valve V2 closed and valve V1 open, a vacuum is drawn in vacuum chamber VC and this results in vacuum gripping of the plates 2 on blanket 123 of the table 1. When the vacuum drawn in chamber VC reaches a predetermined value, the pressure switch PS-A (which is responsive to vacuum in VC) closes. Relay R1 is energized via lines 309, the second contact and the movable contactor 287 of stepping switch 283 and lines 301 and 299, with resultant energization of motor 285 to step the movable contactor 287 to the third contact of switch 283 and close load switches G and N (A and B remaining closed) to initiate

STEP 3

On closure of load switch N (with contacts RFb closed), relay RS is energized to close contacts RSa thereby initiating operation of motor 41 to oscillate the carriage 5 and table 1 carried by the carriage at low speed. On closure of load switch G (with contacts LS1a closed) the "retract" solenoid V7b of valve V7 is energized to retract the piston rods of the hopper end lock cylinders 249, thereby opening the hopper end grippers or locks 245. This results in actuation of limit switch LS1, opening its contacts LS1a and closing its contacts LS1b. The grippers or locks 201 at the foot end of the table remain locked to the rod 191. On closure of contacts LS1b (and with load switch G and contacts LS7a closed), a circuit is completed through the "extend" solenoid V6a of valve V6 for cylinder 217 and the piston rod of this cylinder is extended to swing the table 1 upward about the axis of rod 191 to the ball-loading position BL. Contacts LS9b being closed at this time, a circuit is also completed through the "extend" solenoid V3a of valve 3 for the hopper-operating cylinder 143, and the piston rod of this cylinder is extended to swing the hopper 4 upward to its raised position relative to the table 1 indicated at HR in FIGS. 1 and 8. With the table 1 in its ball-loading position BL, and with the hopper 4 in its raised position HR relative to the table, and with the table and hopper continuously oscillating, the balls 3 are discharged from the hopper onto the table over the plates 2 on the table. On swinging of the table by cylinder 217 to position BL, limit switch LS7 is actuated, and on raising of the hopper by cylinder 143, limit switch LS9 is actuated. Thus, contacts LS7a are opened to deenergize solenoid V6a, contacts LS9b are opened to deenergize solenoid V3a, terminating step 3. Contacts LS7b and LS9a in line 315 close to energize relay R1 via line 315, the third contact and movable contactor 287 of stepping switch 283, and lines 301 and 299, thereby energizing motor 285 to step the movable contactor 287 to the fourth contact of switch 283 and to close the load switch J (switches A, B, G and N remaining closed). This initiates

STEP 4.

On closure of load switch J (in line 383), time delay relay TD1 is energized, and after it has timed out its predetermined time interval, closes its contacts TD1a in line 317. The table 1 (in its ball-loading position) and the hopper 4 (in its raised position) continue to oscillate at low speed during this time interval to shake the balls 3 out of the hopper and deliver them onto the table 1 over the plates 2 on the table. Closure of contacts TD1a at the end of this shake-out interval energizes relay R1 via line 317, the fourth contact and movable contactor 287 of switch 283, and lines 301 and 299, thereby energizing motor 285 to step the movable contactor 287 to the fifth contact of switch 283 and closing load switch F and opening load switches G and J, with load switches A, B and N remaining closed.

STEP 5

On closure of load switch F, and with contacts LS8a closed (limit switch LS8 having been deactuated in Step 3 on extension of the piston rod of cylinder 217), the "retract" solenoid V6b of valve V6 for cylinder 217 is energized, and the piston rod of this cylinder is retracted to lower the table 1 to its level position TL, the hopper 4 remaining in its raised position HR. When the table reaches its lowered position, limit switch LS8 is actuated to open LS8a and close LS8b. With contacts LS2a closed and LS2b open as a result of the retraction of the piston rods of cylinders 249 to open grippers 245 during Step 3, on closure of contacts LS8b the "extend" solenoid V7a of valve V7 for cylinders 249 is energized to extend the piston rods of cylinders 249 to cause the grippers 245 to close on the rod 235 and thus lock the hopper end of the table 1 to the carriage 5. Extension of the piston rods of cylinders 249 actuates limit switch LS2 (and deactuates LS1), opening contacts LS2a and closing contacts LS2b. On closure of contacts LS2b in line 323, relay R1 is energized via line 323, the fifth contact and movable contactor 287 of switch 283 and lines 301 and 299, with resultant energization of motor 285 to step the movable contactor 287 to the sixth contact of switch 283, closing load switches M and O and opening load switch N (A and B still remaining closed) to initiate

STEP 6.

The table 1 is now down in its level position, with the balls 3 spread out over the plates 2 (held flat by vacuum on the blanket 123 of the table). The hopper is up in its raised HR position to keep the balls out of the hopper and to contain slurry on the table. On closure of load switch M (in line 361), and with contacts RSb closed as a result of the opening of load switch N and deenergization of relay RS to close contacts RSb in line 361, relay RF is energized, closing contacts RFa to operate motor 41 at high speed (and opening contacts RFb in line 363). The abrasive slurry, which may comprise fine silica sand in water, for example, is poured on to the table, generally to a depth covering the balls, and with the table oscillating at high speed on account of the high speed operation of motor 41, the balls and slurry abrade the upper surfaces of plates 2 to effect the graining thereof. This graining operation (i.e., the high-speed oscillation of the table in level position with the balls and slurry therein, and with the hopper 4 raised) continues for a graining period determined by the setting of the timer TD2. On closure of the load switches M and O initiating this Step 6, contacts RFc in line 397 close to start the motor 393 of this timer in operation and the timer clutch in line 399 is energized via switch O. When the timer has timed out its preset graining time interval, contacts TD2b open, deenergizing the timer motor 393, and contacts TD2a in line 325 close to energize relay R1 via line 325, the sixth contact and movable contactor 287 of switch 283 and lines 301 and 299, with resultant energization of motor 285 to step the movable contactor 287 to the seventh contact of switch 283, and opening load switches M and O and closing load switches I and N (A and B remaining closed) to initiate

STEP 7.

On opening of load switch M and closure of switch N, the motor 41 reverts to low speed operation (on account of deenergization of relay RF in line 361 and energization of relay RS in line 363). On opening of load switch O, the timer clutch 395 is deenergized. On closure of load switch I, with contacts LS3a closed in line 401, the "retract" solenoid V5b of valve V5 for cylinders 205 is energized to retract the piston rods of these cylinders and thereby open the grippers 201 at the foot (right) end of the apparatus. When these grippers reach their open position, limit switch LS3 is actuated to open its contacts LS3a and close its contacts LS3b in line 403, and limit switch LS4 is deactuated. On closure of contacts LS3b, and with contacts LS5a closed (and LS5b open), the "extend" solenoid V4a of valve V4 for the ball-unloading cylinder 169 is energized to extend the piston rod of this cylinder to swing the table 1 about the axis of rod 235 to its ball-unloading position BU. At the same time, the "retract" solenoid V3b of valve V3 for the hopper-operating cylinder 143 is energized to retract the piston rod of this cylinder and thereby lower the hopper 4 down to its level position relative to the table (shown in solid lines in FIGS. 1 and 8). With the table tilted up in its ball-unloading position BU, and the hopper 4 level with the table, the balls 3 roll down off the plates 2 into the hopper, and the slurry flows down off the plates into the hopper and drains out through the hopper drain screen 105. It will be understood that suitable drainage facilities are provided underneath the hopper to drain away the slurry from the hopper. The screen used at 105 is one with a mesh of a size to hold balls of the desired diameter, but to pass undersized balls, which drain out with the slurry. It will be observed that the table 1 and hopper 4 are oscillating throughout this ball-unloading and slurry-draining Step 7. On extension of the piston rod of cylinder 169 to tilt the table up to its ball-unloading position BU, limit switch LS5 is actuated (and LS6 is deactuated) with resultant opening of its contacts LS5a and closure of its contacts LS5b in line 327. With the latter contacts closed, relay R1 is energized via line 327, the seventh contact and movable contactor 287 of switch 283 and lines 301 and 299 with resultant energization of motor 285 to step the movable contactor 287 to the eighth contact of switch 283, and to close load switches C and D, with load switches A, B, I and N remaining closed, to initiate

STEP 8.

With load switches A, B, I and N remaining closed, the table remains in its ball-unloading position BU with the hopper 4 tilted up, and continues to oscillate at low speed. On closure of load switches C and D (in lines 411 and 407, respectively) time delay relays TD5 and TD3 and the plate spray and hopper spray solenoid valves V8 and V9 are energized and thus opened to discharge sprays of water down on the plates 2 on the table and down on the balls 3 in the hopper 4 to wash off the plates and the balls. The wash water drains out through hopper drain screen 105. After relays TD5 and TD3 have timed out their predetermined time intervals, relay TD5 opens its contacts TD5a (line 413) and relay TD3 closes its contacts TD3a. With the latter contacts closed, relay R1 is energized via line 329, the eighth contact and movable contactor 287 of switch 283 and lines 301 and 299 with resultant energization of motor 285 to step the movable contactor 287 to the ninth contact of switch 283, and to close load switch L and open load switches B, C, D, I and N, load switch A remaining closed, to initiate

STEP 9.

On closure of load switch L (line 357), lamp 355 is energized to signal that the ball unloading and the spraying operations have been completed. On opening of load switch B (i.e., opening of contacts B1 and closure of contacts B2) and with contacts LS10a closed (and LS10b open) from Step 2, coil 367 of the motor for operating the valve V2 is energized to open this valve for drainage of the sump. When it opens, LS10 is actuated to reopen LS10a and close LS10b and LS11 is deactuated to reclose LS11a and open LS11b. Also on opening of B1, vacuum valve V1 is deenergized to cut off the vacuum in the chamber VC. On opening of load switch C, the plate spray valve V8 is deenergized and closes to cut off the plate spray, and on opening of load switch D, the hopper spray valve V9 is deenergized and closes to cut off the hopper spray. On opening of load switch I, the circuit for solenoids V5b, V4a and V3b is broken, and on opening of load switch N, relay RS is deenergized to open contacts RSa (FIG. 13A) and stop the main motor 41 to stop the oscillation of the table. With contacts LS10b closed, relay R1 is energized via line 335, the ninth contact and movable contactor 287 of switch 283 and lines 301 and 299 with resultant energization of motor 285 to step the movable contactor 287 to the tenth contact of switch 283, and to close load switch E, load switches A and L remaining closed, to initiate

STEP 10.

With load switch E closed, relay TD4 is energized, and solenoid valve V10 is energized to open to discharge sprays of water via pipe 271 on the bed plate 75 of the table. This flushes any slurry which may have leaked through the holes 79 to the sump 135, from which it drains out through the open valve V2 (remaining open from Step 9). After timing out its delay, relay TD4 closes its contacts TD4a in line 337 (FIG. 13A) and energizes relay R1 via line 337, the tenth contact and the movable contactor 287 of switch 283 and lines 301 and 299 with resultant energization of motor 285 to step the movable contactor 287 to the eleventh contact of switch 283, and to open load switch E and close load switch P, load switches A and L remaining closed, to initiate

STEP 11.

With load switch E open, the bed spray valve V10 and relay TD4 are deenergized. With load switch P closed, lamp 349 is energized to indicate that the graining of the plates 2 has been completed and that, after removing them from the table 1, the latter is to be lowered. The table remains indefinitely in its ball-unloading position BU (from Step 7) until the "Lower Table" switch 339 in line 341 is closed. Relay R1 is thereupon energized via line 341, the eleventh contact and movable contactor 287 of switch 283 and lines 301 and 299 with resultant energization of motor 285 to step the movable contactor 287 to the twelfth contact of switch 283, and to open load switches L and P and close load switch H, with load switch A remaining closed, thereby initiating

STEP 12.

With load switch H closed, and with contacts LS6a closed and LS6b open (as a result of deactuation of limit switch LS6 in Step 7), the "retract" solenoid V4b of valve V4 for cylinder 169 is energized to retract the piston rod of this cylinder thereby to lower the table 1 from its ball-unloading position BU to its level position TL. When the table is lowered, limit switch LS5 is deactuated and limit switch LS6 is actuated, opening its contacts LS6a and closing its contacts LS6b. With limit switch LS4 deactuated and its contacts LS4a closed and LS4b open from Step 7, the "extend" solenoid V5a of valve V5 for cylinders 205 is energized, and the piston rod of this cylinder is extended to effect locking of the respective grippers 201 on the rod 191. It will be observed that, with this relocking of grippers 201, all components (except for switch 283) are back in their starting position as outlined above at the beginning of the description of the operation of the apparatus. Upon extension of the piston rods of cylinders 205, limit switch LS4 is actuated to open its contacts LS4a and close its contacts LS4b, and on closure of the latter, relay R1 is energized via line 343, the twelfth contact and the movable contactor 287 of switch 283 and lines 301 and 299 to energize motor 285 to step the movable contactor 287 to the thirteenth contact of switch 283. Via energization of relay R1 from line 347, the movable contactor 287 then steps from contact to contact until it returns home to the first contact of switch 283. This ends the cycle, with all components now in position to start another cycle.

Recapitulating the automatic mode of operation of the apparatus, at the start, the table 1 is in its level position TL locked to the carriage 5 at both its ends by grippers 201 and 245, and the hopper 4 is down. The sump valve V2 is open and the vacuum valve V1 is closed. After plates 2 have been placed on the table, and the operation started by actuation of the "Run" switch 277, sump valve V2 is closed and vacuum valve V1 is opened to draw a vacuum in the vacuum chamber VC of the table to hold the plates on the table. Motor 41 is operated at low speed to oscillate the table at low speed. The hopper end grippers or locks 245 are opened via retraction of the piston rods of cylinders 249 and the table is tilted up on the axis of rod 191 to its ball-loading position BL via extension of the piston rod 175 of cylinder 169. The balls are shaken out of the hopper 4 (which is tilted up relative to the table 1) and delivered to the table to overlie the plates. The table, still oscillating, is lowered to its level position TL via retraction of piston rod 175, and the balls spread out over the plates as indicated in FIG. 3. The hopper stays up to keep the balls out of the hopper. The motor 41 is then operated at high speed to oscillate the table at high speed and the slurry is poured on the table to effect abrasion of the surfaces of the plates on the table via the combined action of the balls and the slurry. At the end of this abrasion (graining) phase, the motor 41 is brought back to low speed operation. The grippers 201 at the foot end of the apparatus are unlocked via retraction of the piston rods of cylinders 205, and the table is tilted up about the axis of rod 235 at its head end to its ball-unloading position BU. The hopper 4 is brought down to its lowered position via retraction of piston rod 149 of cylinder 143. The balls roll down off the table 1 into the hopper 4, and the slurry flows down into and drains out of the hopper, the table oscillating at slow speed all the while. Valves V8 and V9 open to deliver water to pipes 263 and 265 to spray off the plates and the balls. These sprays are terminated, motor 41 is deenergized to stop the oscillation of the table, sump valve V2 is opened to dissipate the vacuum in chamber VC and for drainage from the sump 135 and vacuum valve V1 is closed. Valve V10 opens to deliver water to pipe 271 to spray off the table bed plate 75. The plates 2 are removed, the table is brought back down to its level position, and grippers 201 are relocked.

From the above, it will appear that the loading of the table 1 with the balls 3, and the distribution of the balls over the table (i.e., over the plates 2 on the table) is automatically and efficiently effected. Also, the unloading of the balls from the table involving their return to the hopper 4, and the cleaning of the balls and removal of any undersized balls are automatically and efficiently effected. With the table 1 being a vacuum table, the plates may be rapidly placed on the table, and become firmly secured thereto when a vacuum is drawn in chamber VC. The vacuum will hold plates of various sizes and thicknesses, and plates may be and preferably are placed on the table with their edges contiguous, and substantially the entire surface area of the table may be covered with plates for maximum utilization thereof.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. Apparatus for graining plates, such as sheet aluminum plates to be used as lithographic plates, comprising a table to be oscillated in a level position with balls in a slurry thereon for graining plates held on the table, said table having perforations therein and means for establishing a vacuum in said perforations for holding plates on the table, a hopper for the balls at one end of the table, means mounting the table for being tilted from its said level position to a ball-unloading position inclined downwardly toward its said hopper end for gravity discharge of balls from the table to the hopper and also for being tilted to a ball-loading position inclined downwardly away from its said hopper end for gravity delivery of balls from the hopper to the table, means for effecting tilting of the table either to its said ball-unloading or its ball-loading position, said hopper being mounted on the table at said one end thereof for being moved between a lowered position relative to the table and a raised position relative to the table and having means for effecting said movement of the hopper between its said lowered and raised positions, said apparatus further comprising a flexible cover overlying said table having perforations therein in register with said perforations in said table, said cover extending in one piece between said table and said hopper and overlying the bottom surface of said hopper for providing a continuous surface upon which the balls may roll as said balls are delivered to and from the hopper and for permitting movement of said hopper relative to the table.

2. Apparatus as set forth in claim 1 wherein said means for effecting tilting of the table to its ball-unloading position comprises first means for releasably and pivotally locking the table to the carriage at said one end of the table and first power means for tilting up the table about the axis of said first locking means, said means for effecting tilting of the table to its ball-loading position comprising second means for releasably and pivotally locking the table to the carriage at the other end of the table and second power means for tilting up the table about the axis of the second locking means, each power means comprising hydraulic cylinder means interposed between the carriage and the table, said first locking means comprising a first pair of locks operated by hydraulic cylinders at said one end of the table, with a first rod secured to the end of the carriage engageable by these locks, and second locking means comprising a second pair of locks operated by hydraulic cylinders at the other end of the table, with a second rod secured to said carriage engageable by said second pair of locks, the locks of both said first pair and said second pair of locks each comprising a fixed locking jaw adapted to bear on its respective rod and a movable jaw swingable from a locked position in which it cooperates with its respective fixed jaw to surround its respective said rod thereby positively to lock said table to said carriage, and an unlocked position in which it is clear of said rod thereby to permit tilting of the table.

3. Apparatus for graining plates, such as sheet aluminum plates to be used as lithographic plates, comprising a table adapted to be oscillated in a generally level position with balls in a slurry thereon for graining plates held on the table, a hopper for the balls at one end of the table, means mounting the table for being tilted from its said level position to a ball-unloading position inclined downwardly toward its said hopper end for gravity discharge of balls from the table to the hopper and also for being tilted to a ball-unloading position inclined downwardly away from its said hopper and for gravity delivery of balls from the hopper to the table, means for effecting tilting of the table either to its ball-unloading position or to its ball-loading position, this last said means comprising first means for releasably and pivotally locking the table to the carriage at said one end of the table and first power means for tilting up the table about the axis of said first pivotal locking means, said means for effecting tilting of the table to its ball-loading position comprising second means for releasably and pivotally locking the table to the carriage at the other end of the table and second power means for tilting up the table about the axis of said second pivotal locking means, each power means comprising hydraulic cylinder means interposed between the carriage and the table, said first locking means comprising a first pair of locks operated by hydraulic cylinders at said one end of the table, with a first rod secured to said end of the carriage engageable by these locks, and said second locking means comprising a second pair of locks operated by hydraulic cylinders at the other end of the table, with a second rod secured to said carriage engageable by said second pair of locks, the locks of both the first pair and the second pair of locks each comprising a fixed locking jaw adapted to bear on its respective rod and a movable jaw, said movable jaw being swingable from a locked position in which it cooperates with its respective fixed jaw to surround said rod and thereby to positively lock said table to said carriage and an unlocked position in which it is clear of said rod thereby to permit tilting of the table.

* * * * *